United States Patent [19]

Swofford et al.

[11] Patent Number: 4,954,396
[45] Date of Patent: Sep. 4, 1990

[54] POLYESTER FILM COATED IN-LINE WITH AN SILANE

[75] Inventors: Howard W. Swofford, Taylors; Sandra W. Rice, Greer; Grover L. Farrar, Greenville, all of S.C.; David Rudd, Naples, N.C.

[73] Assignee: Hoechst Celanese Corporation, Somerville, N.J.

[21] Appl. No.: 366,051

[22] Filed: Jun. 13, 1989

Related U.S. Application Data

[63] Continuation-in-part of Ser. No. 240,701, Sep. 6, 1988.

[51] Int. Cl.$^5$ .................... B32B 27/08; B32B 27/36
[52] U.S. Cl. .................... 428/340; 156/244.24; 428/447; 428/448; 428/480
[58] Field of Search ............... 428/480, 483, 447, 442, 428/429, 448, 340, 451; 523/213; 430/58; 156/244.24

[56] References Cited

U.S. PATENT DOCUMENTS

| | | | |
|---|---|---|---|
| 4,251,591 | 2/1981 | Chi | 428/480 X |
| 4,410,600 | 10/1983 | McGrail | 428/483 |
| 4,592,953 | 6/1986 | Faviar et al. | 428/480 X |
| 4,663,228 | 5/1987 | Bolton et al. | 428/442 X |
| 4,690,959 | 9/1987 | Plueddemann | 523/213 |
| 4,786,570 | 11/1988 | Yu et al. | 430/58 |
| 4,800,125 | 1/1989 | Plueddemann | 428/447 X |

FOREIGN PATENT DOCUMENTS 171917 7/1985 European Pat. Off. ............ 428/429

OTHER PUBLICATIONS

"Bonding Through Coupling Agents" by Plueddemann; "Silane Coupling Agents" sales brochure from Dow Corning.
"Polyester Film" by Day; Modern Plastics Encyclopedia, 1973-1974.

Primary Examiner—Thomas J. Herbert
Attorney, Agent, or Firm—Gregory N. Clements

[57] ABSTRACT

Oriented polyester film primer coated in-line with a hydrolyzed aminosilane is discovered. The aminosilanes in the unhydrolyzed state have the formula:

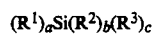

$$(R^1)_a Si(R^2)_b (R^3)_c$$

wherein $R^1$ is a functional group with at least one primary amino group; $R^2$ is a hydrolyzeable group such as a lower alkoxy group, an acetoxy group, or a halide; and $R^3$ is a nonreactive, nonhydrolyzeable group such as a lower alkyl or a phenyl group; with (a) being greater than or equal to 1; (b) being greater than or equal to 1; (c) being greater than or equal to zero; and with a+b+c=4. The hydrolyzed aminosilane is applied to the film as an aqueous solution at any suitable stage during manufacture of the film, i.e., before, or during, or after the stretching operation, but prior to heat setting the film. The resultant primed polyester film is found to exhibit excellent adhesion to other polymeric materials.

17 Claims, No Drawings

POLYESTER FILM COATED IN-LINE WITH AN SILANE

This is a continuation-in-part of application Ser. No. 07/240,701 filed Sept. 6, 1988.

BACKGROUND OF THE INVENTION

(1) Field Of The Invention

The present invention relates to oriented polyester film coated in-line on at least one side with a water soluble primer coating composition comprising a hydrolyzed aminofunctional silane which renders the film more receptive to extrusion coating with other polymeric film materials such as polyolefins.

(2) Prior Art

Oriented polyester film, particularly biaxially oriented film composed of polyethylene terephthalate (PET), has been widely used as a packaging material or as a base for microfilm, reprographic films, proofing films, and the like. It has good optical clarity and toughness which renders it extremely suitable for such applications.

A major use of PET film is in laminations with other polymers and with paper or foil. Often the PET film is extrusion coated with polyethylene or an ethylene copolymer in order to get heat sealing capability, adhesion to another material such as aluminum foil, additional bulk (thickness) or stiffness, or to achieve properties not possible with PET alone.

Unfortunately, the surface of PET film is not very receptive to extrusion coating with other polymers. Numerous primer coatings are known in the prior art for application to the surface of polyester film to improve the adhesion of the film to various materials. Examples of such coatings include compositions based on vinylidene chloride polymers (U.S. Pat. No. 2,698,240), thermosetting acrylic or methacrylic polymers (U.S. Pat. No. 3,819,773) and like materials. Certain water dispersible copolyesters have also been disclosed as adhesives for laminating sheets of polyester film to one another or to sheets of nylon film, as taught in U.S. Pat. Nos. 3,563,942 and 3,779,993. More commonly, solvent based polyurethane adhesives and polyethyleneimine primers are used with attendant problems with solvent emissions and safety. Corona discharge treatment is also used with and without a primer to achieve adhesion between the extrudates.

In common practice, for extrusion coating, a converter will corona treat the PET film as received from the manufacturer, primer coat the corona treated film, dry the primer coat, and then extrusion coat another polymer onto the film (treating film "off" the manufacturing line is commonly referred to as "off-line", treating film during the manufacturing process is commonly referred to as "in-line"). The need to prime the film introduced an additional process step that requires expensive additional equipment and affects yields in off-line treatment accomplished by a converter. In addition, if a solvent based primer is required, additional safety and pollution equipment is required and an additional regulatory burden is imposed.

For the above reasons it would be advantageous for the converter to be able to obtain an already treated or primed film that was directly extrusion coatable without additional priming or corona treatment. To keep from incurring the same costs and problems it is also advantageous that the directly extrusion coatable film be produced by treating or primer coating the film in-line during the manufacturing of the film. For an in-line process it would be ideal for the primer coating to be water based for safety and health reasons, reclaimable (i.e., not cause excessive yellowing or deterioration in physical properties when primer coated film scrap is mixed with fresh polymer and reextruded, which is necessary for an in-line process because of low conversion efficiencies), and hard enough to allow the film to be wound into a roll (as would be necessary for a directly extrusion coatable film) without sticking or blocking.

A directly extrusion coatable polyester film is disclosed in U.S. Pat. No. 4,410,600 to P. T. McGrail. Disclosed is a biaxially oriented PET film coated in-line with a crosslinked styrene-maleic anhydride copolymer. The coated film, however, still requires corona discharge treatment prior to extrusion coating.

The use of silane coupling agents to improve the bonding properties of polyethylene sheets and polyester sheets is known. For example, polyester sheets and polyethylene sheets primed with either vinyltrimethoxysilane or chloropropyltrimethoxysilane have been successfully laminated using a hot melt adhesive such as an ethylene/vinyl acetate terpolymer or an elastomeric polyester as disclosed by E. Plueddemann, "Bonding Through Coupling Agents", Plenum Press, New York, 1985. In addition, the use of N-2-aminoethyl-3-aminopropyltrimethoxysilane (sold under the trademark Z-6020 by Dow Corning) as a primer coating to enhance the adhesion of an ionomer resin (salt of a copolymer of ethylene and methacrylic acid) to glass and to polycarbonate sheets is disclosed in U.S. Pat. No. 4,663,228. Related silanes such as N-3-aminopropyltrialkoxysilanes are known to enhance the adhesion between polyurethane films and glass substrates, as disclosed in published European patent application No. 171,917.

None of these prior art disclosures addresses the problem of direct extrusion coatability of film, particularly of polyester film to polyethylene, ethylene copolymers and ionomers, or other polymer films, without additional primers or additional corona treatment.

Accordingly, it is a primary object of this invention to provide a primer coating which is applied in-line during the polyester film manufacturing process.

Accordingly, it is an object of this invention to provide an oriented, polyester film that can be directly extrusion coatable with other polymers without the need for additional primers or additional corona treatment.

Accordingly, it is also an object of this invention to provide a polyester film having a primer coating thereon in which the primer coated film scrap can be reclaimed without causing excessive yellowing or deterioration in properties of the reextruded polymer.

Most prior art primer coatings employ volatile solvents, thus requiring associated equipment to handle the solvents, associated equipment to protect the workers, and associated equipment to dispose of any waste solvent.

Accordingly, it is another object of the present invention to develop an aqueous primer coating that can be incorporated into most existing systems without the need for expensive associated equipment.

SUMMARY OF THE INVENTION

These and other objects of the invention may now be achieved by the provision of an oriented polyester film which has been in-line primer coated with a hydrolyzed aminofunctional silane to render the film receptive to direct extrusion coating with other polymers.

The aminofunctional silanes useful as a primer for the purposes of this invention are represented by the general formula in their unhydrolyzed state:

$$(R^1)_a Si(R^2)_b (R^3)_c$$

wherein $R^1$ is a functional group with at least one primary amino group, $R^2$ is a hydrolyzeable group such as a lower alkoxy group, an acetoxy group, or a halide, and $R^3$ is a nonreactive, nonhydrolyzeable group such as a lower alkyl or a phenyl group; with (a) being greater than or equal to 1; (b) being greater than or equal to 1; (c) being greater than or equal to zero; and $a+b+c=4$.

Generally, the aminofunctional silane is hydrolyzed in water and applied to one or more surfaces of the oriented polyester film by any conventional in-line method such as spray coating or roll coating. Once the silane primer coating has dried, the primed polyester film is receptive to direct extrusion coating with one or more polymers. The extrusion coating can be conducted by any conventional process. The primer coating serves to bond the polyester film to the extrudate, thus forming a laminate.

In the broadest sense, the present invention is directed to an oriented polyester film having an effective amount of primer coating, applied in-line, to render the film receptive to direct extrusion coating with one or more polymers; the primer represented in the unhydrolyzed state by the general formula:

$$(R^1)_a Si(R^2)_b (R^3)_c$$

wherein $R^1$ is a functional group with at least one primary amino group, $R^2$ is a hydrolyzeable group, and $R^3$ is a nonreactive, nonhydrolyzeable group; with (a) being greater than or equal to 1; (b) being greater than or equal to 1; (c) being greater than or equal to zero; and $a+b+c=4$.

In the broadest sense the present invention is also represented by a laminate having an oriented polyester film, an in-line applied primer coating, and one or more directly extruded polymer(s); the primer coating represented in the unhydrolyzed state by the general formula:

$$(R^1)_a Si(R^2)_b (R^3)_c$$

wherein $R^1$ is a functional group with at least one primary amino group, $R^2$ is a hydrolyzeable group, and $R^3$ is a nonreactive, nonhydrolyzeable group; with (a) being greater than or equal to 1; (b) being greater than or equal to 1; (c) being greater than or equal to zero; and $a+b+c=4$.

DETAILED DESCRIPTION OF THE INVENTION

Silanes are water soluble or water dispersible after hydrolysis, with aminofunctional silanes being especially water soluble. The present inventors have found that aminosilanes provide good adhesion of extrusion coated polymers to polyester film without further priming or corona treatment so long as the aminosilane primer coating is applied in-line, i.e., during the manufacturing process. The scrap from polyester film primed with an aminosilane coating can be reclaimed.

The aminofunctional silanes useful as a primer for the purposes of this invention are represented in their unhydrolyzed state by the general formula:

$$(R^1)_a Si(R^2)_b (R^3)_c$$

wherein $R^1$ is a functional group with at least one primary amino group, $R^2$ is a hydrolyzeable group selected from lower alkoxy group having 1-8 carbon atoms, an acetoxy group, or a halide, and $R^3$ is a nonreactive, nonhydrolyzeable group selected from a lower alkyl group having 1-8 carbon atoms or a phenyl group; with (a) being greater than or equal to 1; (b) being greater than or equal to 1; (c) being greater than or equal to zero; and $a+b+c=4$. Examples of aminosilanes that fit this formula are N-2-(aminoethyl)-3-aminopropyltrimethoxysilane, 3-aminopropyltrimethoxysilane, 4-aminobutyltriethoxysilane, 4-aminobutyldimethylmethoxysilane, and p-aminophenyltrimethoxysilane. The preferred silane is N-2-(aminoethyl)-3-aminopropyltrimethoxysilane having the formula:

$$H_2N(CH_2)_2NH(CH_2)_3Si(OCH_3)_3$$

The hydrolyzed aminosilane is applied to the film as an aqueous solution at any suitable stage during manufacture of the film, i.e., in-line application, before or during the stretching operation, or it may also be applied after the stretching operation but prior to heat-setting the film. The resultant primed polyester film is found to exhibit adhesion to extrusion coated polymeric films.

It has been discovered that the application of the aqueous based aminosilane primer coating to the polyester film after manufacturing the film, or to be more precise, after the polyester film has been heat set such that the majority of the film exists in a crystalline state, does not result in a primer coated polyester film having superior adhesion characteristics more suitable for direct extrusion coating with other polymers. Therefore, to obtain superior results, the aqueous based aminosilane coatings of the present invention are applied before the polyester film has been crystallized by heat setting, i.e., applied in-line.

The primer formulation is prepared by mixing the aminosilane with water at a level within the range of about 0.2 to about 6 percent by weight. Optionally a weak acid, such as acetic acid, may be added to facilitate hydrolysis. At least one of the hydrolyzeable groups of the silane is hydrolyzed into a silanol group (SiOH).

The preferred oriented polyester film for the purposes of this invention is polyethylene terephthalate, although the invention is equally applicable to film based on a crystallizable polyester resulting from the polycondensation of a glycol such as ethylene glycol or butanediol, and mixtures thereof with terephthalic acid, or mixtures of terephthalic acid and other dicarboxylic acids such as isophthalic acid, diphenic acid and sebacic acid, or their polyester forming equivalents, which polyesters are made by methods well known in the art. The film may be produced by techniques also well known in the art using well known apparatus.

For example, the polyester is melted and extruded as an amorphous sheet onto a polished revolving casting drum to form a cast sheet of the polymer. Thereafter, the film is stretched in one direction, either in the direction of extrusion (longitudinal) or perpendicular to the direction of extrusion (transverse) in the case of uniaxially oriented film, and in two directions in the case of biaxially oriented film, that is, the film is stretched in both the longitudinal and transverse directions. The first stretching, to impart strength and toughness to the film, can range from about 3.0 to about 5.0 times.

The hydrolyzed aminosilane primer coating of this invention in the form of an aqueous solution may be applied in-line at one of three stages during the film manufacture, namely; the pre-draw stage at the point between the casting of the amorphous sheet and the first stretch such as disclosed, for example, in British Pat. No. 1,411,564; the inter-draw stage subsequent to the uniaxial drawing but prior to biaxial drawing such as disclosed, for example, in the U.S. Pat. No. 4,214,035; or the post draw stage subsequent to biaxial stretching, but prior to heat-setting the film. The primer is dried using conventional means such as hot air dryers or infrared dryers, or a combination of both.

In a preferred embodiment, the primer coating is applied inter-draw, i.e., after the film is uniaxially stretched (after the film is stretched in one direction), but before the film is stretched in the orthogonal direction. In the preferred embodiment, the polyester film is first stretched in the longitudinal direction prior to coating. The film is coated by any of the well known techniques employed in the art. For example, coating may be effected by roll coating, spray coating, slot coating or immersion coating. In the preferred embodiment, the polyester film is coated by means of gravure roll.

Corona discharge treatment decreases the hydrophobic character of the polyester film surface, which permits the water based primer coating to more easily wet the surface and thus improve the adhesion of the primer coating to the surface. The effect of the corona treatment is lost in the heat setting step. So corona treatment is necessary to obtain wetting of the aminofunctional silane primer coating, but has no significant effect of the extrusion coated polymers to the polyester film.

The hydrolyzed aminosilane of the present invention is applied to the film as an aqueous solution at a concentration of from about 0.2 to about 6 percent by weight of the hydrolyzed aminosilane. A weak acid such as acetic acid may be added to facilitate hydrolysis. The preferred concentration of the hydrolyzed aminosilane is within the range of about 0.25 to 2.5 percent by weight. The preferred concentration is such to yield a final dry primer coating weight of from $1.0 \times 10^{-3}$ g/m² to about $4.0 \times 10^{-2}$ g/m² of film surface, and more preferably $2.0 \times 10^{-3}$ g/m² to $2.0 \times 10^{-2}$ g/m².

The coating of this invention may be applied to one or both sides of the film, or it may be applied to one side and a different coating such as a thermosetting acrylic or methacrylic coating as taught in U.S. Pat. No. 4,214,035 applied to the opposite side. The coating may also be applied over a different primer coating to which it will adhere and which is already present on the surface of the film, such as a thermosetting acrylic coating as described in U.S. Pat. No. 3,819,773.

The coating composition may also contain other ingredients so long as such ingredients do not detract from the adhesion promoting action of the hydrolyzed aminosilane. Such would include minor amounts of colloidal silica, dyes, pH regulating agents, wetting agents, and the like. The primer coating is present on the film surface as a continuous coating, which term is also intended to include where the primer may form a plurality of islands or segregated regions of coating.

Scrap film made during production that is coated with the primer coatings of this invention can be ground and mixed with fresh polyester, remelted, and reextruded to produce oriented films. Such film produced, containing significant quantities of primed scrap reclaim, exhibits very little degradation of physical properties due to the presence of the coating impurity and color generation is also low. Thus the primed film of this invention offers commercial advantage to the film manufacturer over many other primed films, such as films primed with vinylidene chloride containing polymers as disclosed in U.S. Pat. Nos. 2,627,088 and 2,698,240, which tend to degrade and discolor when reclaimed as set forth above.

Laminates may be formed by the well known process of extrusion coating wherein a molten sheet of polymer is continuously deposited on the primer coated surface of a moving web of film. Laminates of polyester with polyethylene, ethylene-vinyl acetate copolymers, polyvinyl alcohol, polyvinyl acetate, and other polymers may be readily made by the extrusion coating process.

A film of PET which is extrusion coated with polyethylene has particularly useful properties such as good heat sealing capability or adhesion to other materials such as aluminum foil. Although the inventors are not certain, it is theorized that the amino group in the primer reacts with the heated, oxidized polyethylene when it is extruded onto the PET film, thus firmly bonding the primer to the polyethylene.

The thickness of polyester film suitable for use in this invention may generally range from about 0.25 to about 10 mils or more.

The following examples are illustrative of the invention:

FILM PREPARATION

N-2-(aminoethyl)-3-aminopropyltrimethoxysilane (AE-APTMS) (sold by Dow Corning as Z-6020 and by Union Carbide as A-1120) or N-3-aminopropyltrimethoxysilane (APTMS) was dispersed in ordinary tap water to form a concentration of from about 0.25 percent to 1.5 percent by Weight AE-APTMS (or other aminosilane, if indicated). Acetic acid was added at a concentration of 0.2 percent by weight to facilitate hydrolysis.

Polyethylene terephthalate polymer was melted and extruded through a slot die onto a casting drum maintained at a temperature of about 20° C. The melt solidified to form a cast sheet. The cast sheet was longitudinally stretched at a draw ratio of approximately 3.5 to 1 while maintained at a temperature of about 80° C.

The longitudinally drawn film was corona treated by a corona discharge apparatus and thereafter coated by reverse gravure with the solution of hydrolyzed aminosilane prepared above.

The corona treated, longitudinally drawn, coated film was dried at a temperature of about 100° C. Thereafter, the film was stretched in the transverse direction at a draw ratio of 3.9 to 1 to produce a biaxially drawn film. The thickness of the drawn film was from about 0.5 mils to about 3 mils. The biaxially drawn film was then heat set at a maximum temperature of 230° C.

Normally before extrusion coating the film as supplied by manufacturer, the raw film is corona treated and primed in a separate process step prior to extrusion coating. The use of polyester film in-line coated with an aqueous based aminofunctional silane renders additional corona treatment unnecessary. Corona treatment of the aminofunctional silane primed polyester film has no effect or a slightly negative effect on the adhesion of the extrusion coated polymer to the primed polyester film.

EXAMPLES 1-8

Polyethylene terephthalate film was made and coated as described in FILM PREPARATION and the film was 0.5 mil thick. The film was in-line coated with an aqueous coating of an amino silane as shown in Table 1. A composite roll was made containing 100 feet of film for each coating formulation and the roll was run through an extrusion coater and coated with about 1 mil of low density polyethylene (LDPE) (USI resin with melt index of 14). The melt temperature was 327° C. (620° F.) and the air gap was approximately 8 inches. No additional corona treatment or priming was used.

TABLE 1

| Film | Coating Formulation (% By Weight) | Coating Weight (g/m$^2$) |
| --- | --- | --- |
| Example 1 | Uncoated control | — |
| Example 2 | 0.25% AE-APTMS* | $1.3 \times 10^{-3}$ |
| Example 3 | 0.5% AE APTMS* | $2.6 \times 10^{-3}$ |
| Example 4 | 1.0% AE-APTMS* | $5.4 \times 10^{-3}$ |
| Example 5 | 1.5% AE-APTMS* | $8.0 \times 10^{-3}$ |
| Example 6 | 0.5% APTMS** | $2.0 \times 10^{-3}$ |
| Example 7 | 1.0% APTMS** | $4.0 \times 10^{-3}$ |
| Example 8 | 1.5% APTMS** | $6.0 \times 10^{-3}$ |

*AE-APTMS is N-2-(aminoethyl)-3-aminopropyltrimethoxysilane
**APTMS is N-3-aminopropyltrimethoxysilane The adhesion of the low density polyethylene to the uncoated control of Example 1 was 0.09 lbs./in. using ASTM tests D882 and E4. The adhesion of the low density polyethylene to the films of Examples 2–8 was so good that the two layers could not be separated in order to do a peel test. Separation at the PET/LDPE interface could not be achieved with hot water, toluene, or tetrahydrofuran. Adhesion was excellent with both APTMS (N-3-aminopropyltrimethoxysilane) and AE-APTMS (N-2-aminoethyl)- 3-aminopropyltrimethoxysilane).

EXAMPLES 9-28

Polyethylene terephthalate film was made and coated as described in FILM PREPARATION and the film was 0.5 mil thick. The film was in-line coated with an aqueous coating of an amino silane in a range of from $1 \times 10^{-3}$ g/m$^2$ to $3.0 \times 10^{-2}$ g/m$^2$. A composite roll Was made containing 100 feet of film for each coating formulation and the roll was run through an extrusion coater and coated with about 0.75 mil of SURLYN ® 1652, an ionomer resin. The melt temperature was 307° C. (585° F.). Half of each sample was corona treated a second time at 2.5 kVA prior to extrusion coating and the other half was not corona treated a second time. Another composite roll of the same film was coated with 0.75 mil of Norchem 1014, a low density polyethylene resin, extruded at 330° C. (625° F.). As with the SURLYN ®, half of each sample was corona treated and the other half was not. The peel strength was measured using an Instron tester. (During the extrusion coating operation strips of untreated polyester were inserted between the ends of the layers to provide a nonadhered section where the two layers could be separated for the peel test.)

The peel adhesion between the SURLYN ® or LDPE, and the aminosilane coated PET was measured on an Instron machine. A one inch wide strip was cut from the laminate and the two layers, either PET and SURLYN ®, or PET and LDPE were separated at one end. The separated end of the PET was inserted into the upper jaw of the Instron with approximately one inch distance between the jaw and the point where the PET was still bonded to the SURLYN ® or LDPE. The free end of the SURLYN ® or LDPE was inserted into the lower jaw so that the strip was vertically aligned. The jaws were then moved away from one another and the force necessary to peel one layer from the other was recorded and reported in Table 2.

TABLE 2

| Film | Coating Formulation (% By Weight) | Corona | Adhesion(lbs./in.) SURLYN | LDPE |
| --- | --- | --- | --- | --- |
| Example 9 | 0.25% AE-APTMS | YES | 2.62 | 1.23 |
| Example 10 | 0.25% AE-APTMS | NO | 2.84 | 1.22 |
| Example 11 | 0.50% AE-APTMS | YES | 2.17 | 1.43 |
| Example 12 | 0.50% AE-APTMS | NO | 4.25 | 1.36 |
| Example 13 | 1.00% AE-APTMS | YES | 2.42 | 1.23 |
| Example 14 | 1.00% AE-APTMS | NO | 2.42 | 1.30 |
| Example 15 | 1.50% AE-APTMS | YES | 2.50 | 1.41 |
| Example 16 | 1.50% AE-APTMS | NO | 2.54 | 1.42 |
| Example 17 | 0.25% APTMS | YES | 3.19 | 1.28 |
| Example 18 | 0.25% APTMS | NO | 2.89 | 1.43 |
| Example 19 | 0.50% APTMS | YES | 2.24 | 1.25 |
| Example 20 | 0.50% APTMS | NO | 3.13 | 1.18 |
| Example 21 | 1.00% APTMS | YES | 1.58 | 1.23 |
| Example 22 | 1.00% APTMS | NO | 1.79 | 1.29 |
| Example 23 | 1.50% APTMS | YES | 1.94 | 1.67 |
| Example 24 | 1.50% APTMS | NO | 2.19 | 1.27 |
| Example 25 | Copolyester* | YES | 1.03 | 0.44 |
| Example 26 | Copolyester* | NO | 0.02 | 0.08 |
| Example 27 | Uncoated | YES | 1.05 | 1.03 |
| Example 28 | Uncoated | NO | 0.01 | 0.11 |

*Film coated with a water dispersible copolyester coating described in U.S. Pat. No. 4,493,872.

With the uncoated PET film and with the copolyester coated film, corona treatment prior to extrusion coating is necessary to get some adhesion of the SURLYN ® 1652 and Norchem ® 1014 to the polyester film. Even with corona treatment, adhesion to the uncoated PET and the copolyester coated film was not as good as the aminosilane coated film. Also, a second corona treatment of aminosilane coated film prior to extrusion of the SURLYN ® or LDPE was not necessary and made little or no difference in the adhesion. Adhesion was good for both AE-APTMS and APTMS at a concentration as low as 0.25 percent by weight.

EXAMPLE 29

The previous examples were all in-line primer coated film. This example and Example 30 compare in-line versus off-line coating. N-2-(aminoethyl)-3-aminopropyltrimethoxysilane (AE-APTMS) was dissolved in deionized water to a concentration of 1.5 percent by weight of AE-APTMS.

Polyethylene terephthalate polymer was melted and extruded as described in Film Preparation. The longitudinally drawn film was corona treated by a corona discharge apparatus and thereafter coated by reverse gravure with the solution of hydrolyzed aminosilane prepared above. The corona treated, longitudinally drawn, coated film was dried at a temperature of about 100° C. Thereafter, the film was stretched in the transverse direction at a draw ratio of about 3.5 to 1 to produce a biaxially drawn film. The biaxially drawn film was then heat set at a maximum temperature of 230° C. The dry weight of the coating was about 0.012 g/m². The thickness of the base film was about 0.5 mil. (This process of producing a coated PET film is referred to as "in-line coating".)

The film, coated in-line with the aminosilane triol homopolymer, was extrusion coated, without a second corona treatment, with Norchem ® 1014 low density polyethylene at 10 pounds/ream using an ER-WE-PA coater/laminator. The LDPE was applied at an extrusion temperature of 315° C. (600° F.), line speed of 200 fpm, and an air gap of 8 inches.

The experiment was repeated. The results are set forth in Table 3.

EXAMPLE 30

PET film was prepared as described in Film Preparation and in Example 29, except that the film was not in-line coated with AE-APTMS. The hydrolyzed AE-APTMS was applied to the PET film off-line in a separate coating step on the ER-WE-PA coater/laminator using a 200 quad gravure cylinder in reverse mode. The coating weight was 0.10 g/m². The film was then extrusion coated with LDPE as described for Example 29.

The experiment was repeated. The results are set forth in Table 3.

The peel adhesion between the LDPE and the aminosilane coated PET for Examples 29 and 30 was as described with respect to Examples 9–28.

TABLE 3

|  |  | Coat Wt. | Bond Strength |
|---|---|---|---|
| Example 29 Repeat | In-Line | 0.012 g/m² | 1.40 lbs/inch |
|  |  |  | 1.17 |
|  |  | Average = | 1.28 |
| Example 30 Repeat | Off-Line | 0.100 g/m² | 0.60 |
|  |  |  | 0.54 |
|  |  | Average = | 0.57 |

PET film, in-line coated with aminosilane as in Example 29, clearly gives superior adhesion to extrusion coated polymers compared with PET off-line coated with aminosilane as in Example 30.

EXAMPLE 31

In the previous examples mono- and diamines were tested. In this example, a triamine was tested.

PET film was prepared and primed as described in Film Preparation, except that the aminosilane employed was N-2-aminoethyl-2 aminoethyl-3-aminopropyltrimethoxysilane (AE-AE-APTMS) dissolved and hydrolyzed at a concentration of 0.50 percent, 1.0 percent and 1.5 percent by weight in deionized water. The primed film was extrusion coated with either SURLYN ® 1652 resin or Norchem 1014 low density polyethylene (LDPE) as described with respect to Examples 9–28. The adhesion was measured as described in Examples 9–28 and the results are set forth in Table 4.

TABLE 4

| % By Weight Coating Formulation | g/m² Dry Coating Weight | Bond Strength (lbs/in) SURLYN ® | LDPE |
|---|---|---|---|
| 0.50 | 0.0098 | 2.25 | 1.20 |
| 1.0 | 0.0245 | 1.63 | 1.00 |
| 1.5 | 0.0353 | 1.17 | 1.38 |

The results show that triamines are good for primer coating PET film for direct extrusion coating purposes.

Thus it is apparent that there has been provided, in accordance with the invention, a primed film capable of being extrusion coated and an extrusion coated laminate that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the invention.

What is claimed is:

1. An oriented polyester film having a primer coating composition on at least one side thereof, said primer coating composition comprising the dried residue of a hydrolyzed aminosilane compound having the formula in the unhydrolyzed state:

$$(R^1)_a Si(R^2)_b (R^3)_c$$

wherein $R^1$ is a functional group with at least one primary amino group, $R^2$ is a hydrolyzeable group selected from the group consisting of a lower alkoxy group having 1–8 carbon atoms, $C_1$ to $C_8$, an acetoxy group, or a halide group, and $R^3$ is a nonreactive, nonhydrolyzeable group selected from the group consisting of a lower alkyl having 1–8 carbon atoms, or a phenyl group; with (a) being greater than or equal to 1; (b) being greater than or equal to 1; (c) being greater than or equal to zero, and with $a+b+c=4$, said primer coating composition being applied in-line to said polyester film prior to heat setting said film at a weight effective to improve the adhesion of one or more extrusion coated polymers to said polyester film.

2. The film of claim 1, wherein the hydrolyzeable group $R^2$ is an alkoxy, selected from the group of a methoxy or an ethoxy.

3. The film of claim 1, wherein the amino functional group $R^1$ is selected from the group of a primary amino group, a diamine, or a triamine.

4. The film of claim 1, wherein the said aminosilane is selected from the group consisting of
N-2-(aminoethyl)-3-aminopropyltrimethoxysilane,
3-aminopropyltrimethoxysilane, 3-aminopropyltriethoxysilane and
N-2-aminoethyl-2-aminoethyl-3-aminopropyltrimethoxysilane.

5. The film of claim 1, wherein said oriented polyester film is polyethylene terephthalate.

6. The film of claim 5, wherein said film is biaxially oriented polyethylene terephthalate.

7. The film of claim 6, wherein said film is prepared by melt extruding a substantially amorphous polyester film and thereafter orienting the film by stretching it sequentially in two directions and heat setting the film, said primer coating composition being applied to said film as an aqueous solution prior to stretching the film in one direction, or subsequent to stretching in one direction but prior to stretching in a mutually perpendicular direction, or subsequent to stretching in two directions.

8. The film of claim 7, wherein said film is subjected to a corona discharge treatment prior to the application of said primer coating composition.

9. The film of claim 7, wherein said primer coating composition is applied subsequent to stretching in one direction but prior to stretching in a mutually perpendicular direction.

10. The film of claim 7, wherein said primer coating composition is an aqueous dispersion of an aminosilane compound selected from the group consisting of N-2-(aminoethyl)-3-aminopropyltrimethoxysilane, 3-aminopropyltrimethoxysilane, 3-aminopropyltriethoxysilane, N-2-aminoethyl-2-aminoethyl-3-aminopropyltrimethoxysilane.

11. The film of claim 10, wherein said primer coating composition is present at a weight of from about $1.0 \times 10^{-3}$ to about $4.0 \times 10^{-2}$ grams per square meter of film surface on a dry weight basis.

12. The primed film of claim 1, having a layer of another polymer adhered to the primer coated surface of said primed film.

13. The film of claim 12, wherein said polymer is extrusion coated onto the primed film.

14. The film of claim 13, wherein the extrusion coated polymer is a polyester or copolyester.

15. The film of claim 13, wherein the extrusion coated polymer is a polyolefin.

16. The film of claim 15, wherein the extrusion coated polymer is selected from polyethylene or an ethylene copolymer.

17. The film of claim 13, wherein said extrusion coated polymer is selected from the group consisting of an ionomer resin, ethylene vinyl acetate, polyvinyl alcohol, or polyvinyl acetate.

* * * * *